F. WOLF.
Steam Plow.
No. 29,644.  Patented Aug. 14, 1860.
Fig. 1
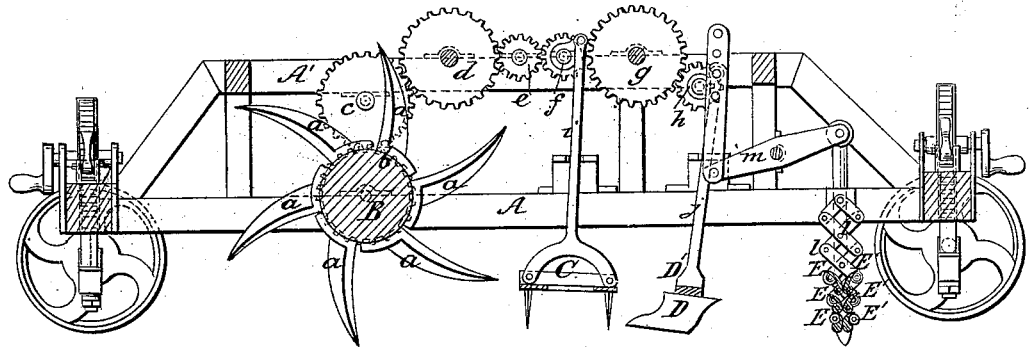
Fig. 2
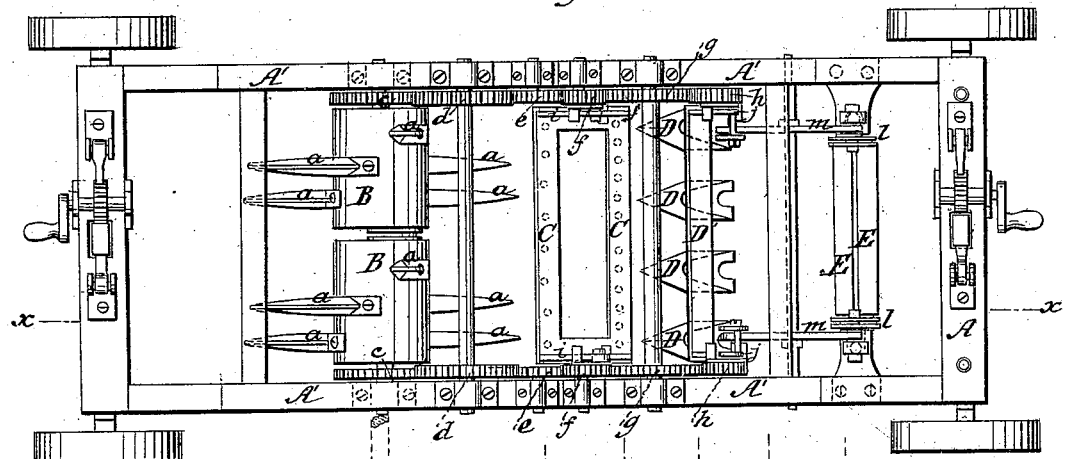
Fig. 3  Fig. 4
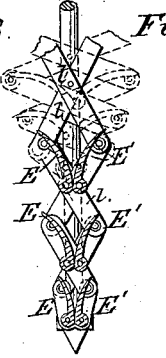
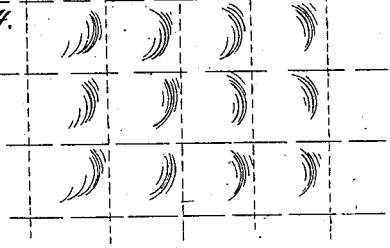
Witnesses:
Inventor:
Ferdinand Wolf.

UNITED STATES PATENT OFFICE.

FERDINAND WOLF, OF BROOKLYN, NEW YORK.

IMPROVEMENT IN CULTIVATORS.

Specification forming part of Letters Patent No. 29,644, dated August 14, 1860.

*To all whom it may concern:*

Be it known that I, FERDINAND WOLF, of Brooklyn, in the county of Kings and State of New York, have invented a new and Improved Cultivator; and I do hereby declare that the following is a full, clear, and exact description of the same, reference being had to the accompanying drawings, forming a part of this specification, in which—

Figure 1 is a longitudinal vertical section of my cultivator, taken in the plane indicated by the line $x\,x$, Fig. 2. Fig. 2 is a plan or top view of the same. Fig. 3 is a vertical transverse section of the plates on an enlarged scale. Fig. 4 shows the appearance of the ground after having been acted upon by my cultivator.

Similar letters of reference indicate corresponding parts in the several figures.

My invention has for its object the employment of means whereby I am enabled to prepare and lay out the ground in a proper and effectual manner preparatory to the planting of seed in hills. For this purpose my invention consists, first, in arranging in a framework of suitable construction a rotary cylinder or roller provided with teeth for tearing up the ground, and operating so as to transmit motion to the other devices; secondly, in combining a gang of plows having a peculiar motion with rising and falling plates placed transversely to the machine, thereby effecting the formation of the hills; thirdly, in a peculiar device for making the transverse drills, so operated by means of lazy-tongs and the gearing connected therewith that the earth is thrown up on each side, thereby forming the sides of the hills in a transverse direction.

To enable those skilled in the art to fully understand my invention, I will proceed to describe its construction and operation with reference to the drawings.

A A' represent the frame-work of the machine, which is mounted on four wheels, and so arranged as to be capable of being raised or lowered as occasion may require. In the forward part of this frame-work I place a roller, B, having its bearings on the frame A, and provided with teeth $a$, which incline slightly backward. These teeth strike the ground as the machine is drawn along, tearing up the ground, and giving a rotary motion to the roller B. The depth of their action on the ground is regulated by raising or lowering the framework on the wheel-axles by means of suitable devices attached thereto. The roller B transmits motion to the other parts of the machine by means of a series of cog-wheels, $b\,c\,d\,e\,f\,g\,h$.

C is a harrow, of quadrilateral form, having teeth secured to its under side and provided with crank-levers $i$, secured to crank-pins on the wheels $f$, which wheels in their revolution give to said harrow an up and down sweeping motion, which effectually smooths over the surface of the ground already turned up by the teeth $a$ on the roller B, and renders the same light and friable.

D is a gang of plows arranged in a line transversely to the length of the machine, and secured to a cross-piece, D', at suitable distances apart, said cross-piece connecting with the wheels $h$ by means of crank-levers $j$. These plows have a peculiar scooping motion given them by means of this attachment, and at every revolution of the wheels $h$ they are caused to descend, their toes entering the ground first, and to pass rapidly forward and out again, thus forcing the earth on each side.

E E' are the plates, two or more in number, arranged transversely with the machine. These plates are operated by means of lazy-tongs $l$, (shown more particularly in Fig. 3,) said lazy-tongs being connected by means of rods to a walking-beam, $m$, which receives its motion from the wheels $h$. These lazy-tongs serve to give to the plates E E' an upward and downward motion, causing them to contract or come closer together as they enter the ground and expand or spread out as they rise, which latter motion throws the earth on each side of the drill, and thereby forms the sides of the hills in a transverse direction. The drills made by these plates serve also as guide-rows, whereby to regulate the machine so that its devices shall operate in proper time to make the hills equidistant apart and in line with each other at every new transit of the machine across the field.

The operation of the machine will be readily understood: As it is drawn along the teeth on the roller B strike the earth, tearing it up and leaving it in a mellow condition for the operation of the harrow C, which now follows, knocking the lumps to pieces, pulverizing the earth, and leaving the same in a light and friable condition. The plows D now follow, descend-ing at stated periods, according to the distance apart it is intended they shall make the rows of hills, and forcing the earth on each side in one direction. The plates E E' follow the plows, throwing up the earth on each side in an opposite or right-angular direction to that thrown by the plows, and thus completing the formation of the hills and leaving a furrow by which to set the machine so that it shall operate correctly.

From this description it will be seen that my machine not only digs up the ground, but it harrows it, and forms the hills in such a manner that they have all the advantages of being made by hand with a hoe, in addition to being in a much straighter line, which latter greatly facilitates the subsequent cultivation of the growing crop. Thus it will be seen that my machine has an advantage over all other machines for similar purposes, in the fact that it thoroughly prepares the ground and forms the hills ready to receive the seed.

Having thus described my invention, what I claim as new, and desire to secure by Letters Patent, is—

1. The roller B, provided with teeth $a$, in combination with the harrow C, plows D, plates E E', and the gearing through which motion is given to the several parts, all arranged and operating substantially as and for the purposes herein set forth.

2. The combination of the plows D with the plates E E', operating so as to lay out the ground in regular hills, substantially as herein described.

3. The plates E E', operated by means of lazy-tongs $l$, substantially as and for the purposes herein specified.

FERDINAND WOLF.

Witnesses:
B. GIROUXE,
M. M. LIVINGSTON.